US012385285B2

(12) United States Patent
Morimoto et al.

(10) Patent No.: US 12,385,285 B2
(45) Date of Patent: Aug. 12, 2025

(54) HEATING COOKING APPARATUS

(71) Applicant: SHARP KABUSHIKI KAISHA, Osaka (JP)

(72) Inventors: Shigenori Morimoto, Osaka (JP); Kazuhiro Sakamoto, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 278 days.

(21) Appl. No.: 18/226,752

(22) Filed: Jul. 26, 2023

(65) Prior Publication Data

US 2024/0044174 A1 Feb. 8, 2024

(30) Foreign Application Priority Data

Aug. 2, 2022 (JP) ................................ 2022-123292

(51) Int. Cl.
*E05B 47/00* (2006.01)
*E05B 41/00* (2006.01)
*E05B 65/00* (2006.01)
*H05B 6/64* (2006.01)

(52) U.S. Cl.
CPC .......... *E05B 47/0012* (2013.01); *E05B 65/00* (2013.01); *H05B 6/6414* (2013.01); *E05B 41/00* (2013.01); *E05B 2047/0017* (2013.01); *E05B 2047/0021* (2013.01); *E05B 2047/0036* (2013.01); *E05B 2047/0054* (2013.01)

(58) Field of Classification Search
CPC ...... E05B 47/0012; E05B 65/00; E05B 41/00; E05B 2047/0017; E05B 2047/0021; H05B 6/6414; H05B 6/6417
See application file for complete search history.

(56) References Cited

U.S. PATENT DOCUMENTS

2004/0182856 A1* 9/2004 Lee ........................ F24C 15/022 219/739
2023/0345590 A1* 10/2023 Jeong ................... H05B 6/6417
2023/0403769 A1* 12/2023 Chen .................... E05B 47/0002
2024/0027075 A1* 1/2024 Reid ........................ E05F 5/027
2024/0138614 A1* 5/2024 Ding ..................... H05B 6/6417
2025/0027655 A1* 1/2025 Yeo ....................... H05B 6/6417
2025/0159169 A1* 5/2025 Misra ................... H04N 19/105

FOREIGN PATENT DOCUMENTS

JP 2010-139120 A 6/2010

* cited by examiner

*Primary Examiner* — Daniel J Rohrhoff
(74) *Attorney, Agent, or Firm* — ScienBiziP, P.C.

(57) ABSTRACT

A heating cooking apparatus includes a main body, a door, a latch head provided at the door, a holding member provided at the main body and that holds the latch head to cause the door to be in a locked state, a door opening button, a door unlock key, a displacement transmission mechanism that transmits a displacement of the door opening button to cause that displacement to release the locked state of the door by the holding member, a locking cam that is movable between a limiting position at which at least one of the displacement of the door opening button and the transmission by the displacement transmission mechanism is limited, and a non-limiting position at which neither is limited, and a driving unit that causes the locking cam to move to the non-limiting position in response to an operation of the door unlock key.

7 Claims, 19 Drawing Sheets

HEATING COOKING APPARATUS

CROSS-REFERENCE TO RELATED APPLICATIONS

This application claims the benefit of priority to Japanese Patent Application Number 2022-123292 filed on Aug. 2, 2022. The entire contents of the above-identified application are hereby incorporated by reference.

BACKGROUND

Technical Field

The present disclosure relates to a heating cooking apparatus such as a microwave oven that heats an object to be heated by using microwaves or the like. More particularly, the present disclosure relates to a heating cooking apparatus having a configuration in which a door of a front face opening of a heating chamber is opened by a mechanical operation performed on a push button, a handle, or the like.

In the heating device disclosed in JP 2010-139120 A, a hook 5 is inserted, intentionally by a user or automatically, into an insertion hole 6 in an upper surface of an opening/closing door (door) 3 of a heating chamber 2 included in a heating device main body 1 so that the door 3 does not open during heating or when the temperature of the heating chamber is high. With this configuration, the heating device is configured such that the opening of the door 3 is restricted to prevent an unintended operation of the door 3.

SUMMARY

To open the door 3 in the heating device described in JP 2010-139120 A, it is necessary to perform the following two-stage mechanical operation.

(1) Unlock the lock formed by the hook 5 by opening an operation unit front plate 10 and sliding a knob 7 upward.

(2) Grip a handle 4 and open the door 3 toward the front.

The second mechanical operation of the two operations has been always required in many heating devices in the related art, but the heating device described in JP 2010-139120 A also requires the first mechanical operation. In other words, since a two-stage mechanical operation is required every time the door 3 is to be opened, some users may feel that such an operation is troublesome.

Further, whenever the user performs the mechanical operations for locking the door 3 or unlocking the lock of the door 3, for example, the user may feel it inconvenient that the operations require both hands in some cases, or the user may forget to perform the operation for locking the door 3 because the operation is troublesome.

An object of the present disclosure is to provide a heating cooking apparatus with which it is possible, with one hand, to easily perform a non-mechanical operation (first mechanical operation described above) to unlock a lock before opening a door, and to also automatically lock the door.

A heating cooking apparatus according to the present disclosure includes a main body including a heating chamber accommodating an object to be heated, a door configured to open and close a front face opening of the heating chamber, a locking member provided at the door, a holding member provided at the main body and configured to hold the locking member to cause the door to be in a locked state, a first operation member configured to be displaced between a first position and a second position and to be operated to open the door, a second operation member configured to be operated to release the locked state of the door, a displacement transmission mechanism configured to transmit a displacement of the first operation member from the first position, and to release the locked state of the door by the holding member by causing the first operation member to be displaced to the second position, a displacement transmission limiting member configured to be movable between a limiting position at which at least one of the displacement of the first operation member and the transmission by the displacement transmission mechanism is limited, and a non-limiting position at which neither the displacement of the first operation member nor the transmission by the displacement transmission mechanism is limited, and a driving unit configured to cause the displacement transmission limiting member to move to the non-limiting position in response to an operation of the second operation member.

According to the present disclosure, it is possible, with one hand, to easily perform a non-mechanical operation to release a lock before opening a door of a heating cooking apparatus, and to also automatically lock the door.

BRIEF DESCRIPTION OF DRAWINGS

The disclosure will be described with reference to the accompanying drawings, wherein like numbers reference like elements.

DESCRIPTION OF EMBODIMENTS

Figure 1:
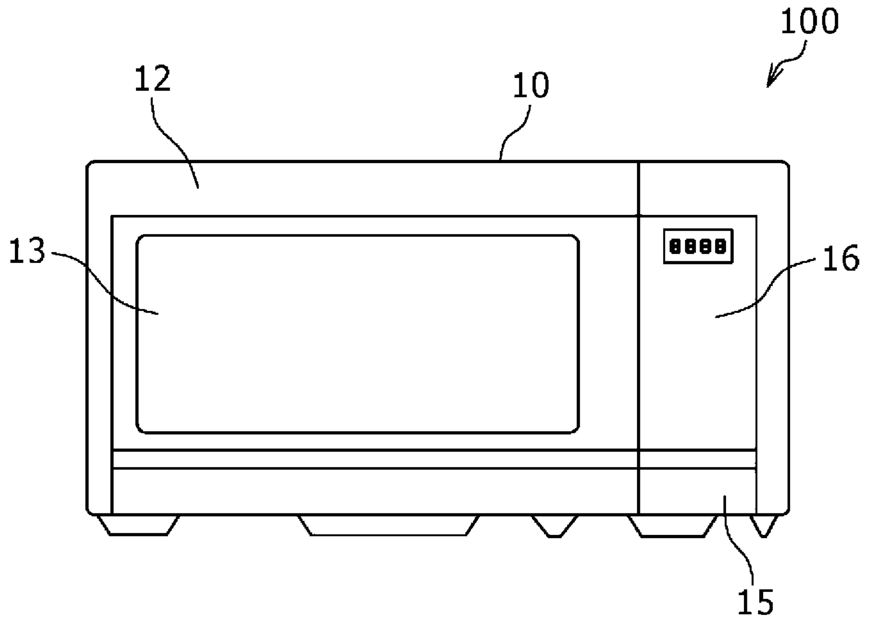
FIG. 1 is a front view of a heating cooking apparatus 100 according to a first embodiment of the present disclosure with a door 12 closed.

Embodiments of the present disclosure will be described with reference to the drawings. Note that, in the drawings, the same or equivalent components are denoted by the same reference numerals and signs, and description thereof will not be repeated.

First Embodiment

1.1 Overall Basic Configuration

Figure 2:
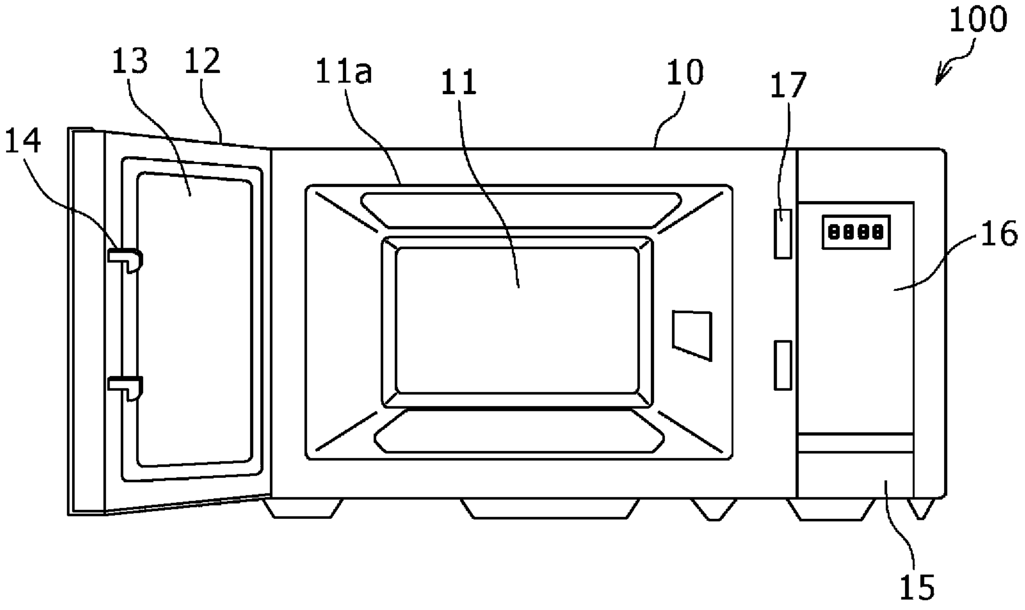
FIG. 2 is a front view of the heating cooking apparatus 100 with the door 12 open.
Figure 3:
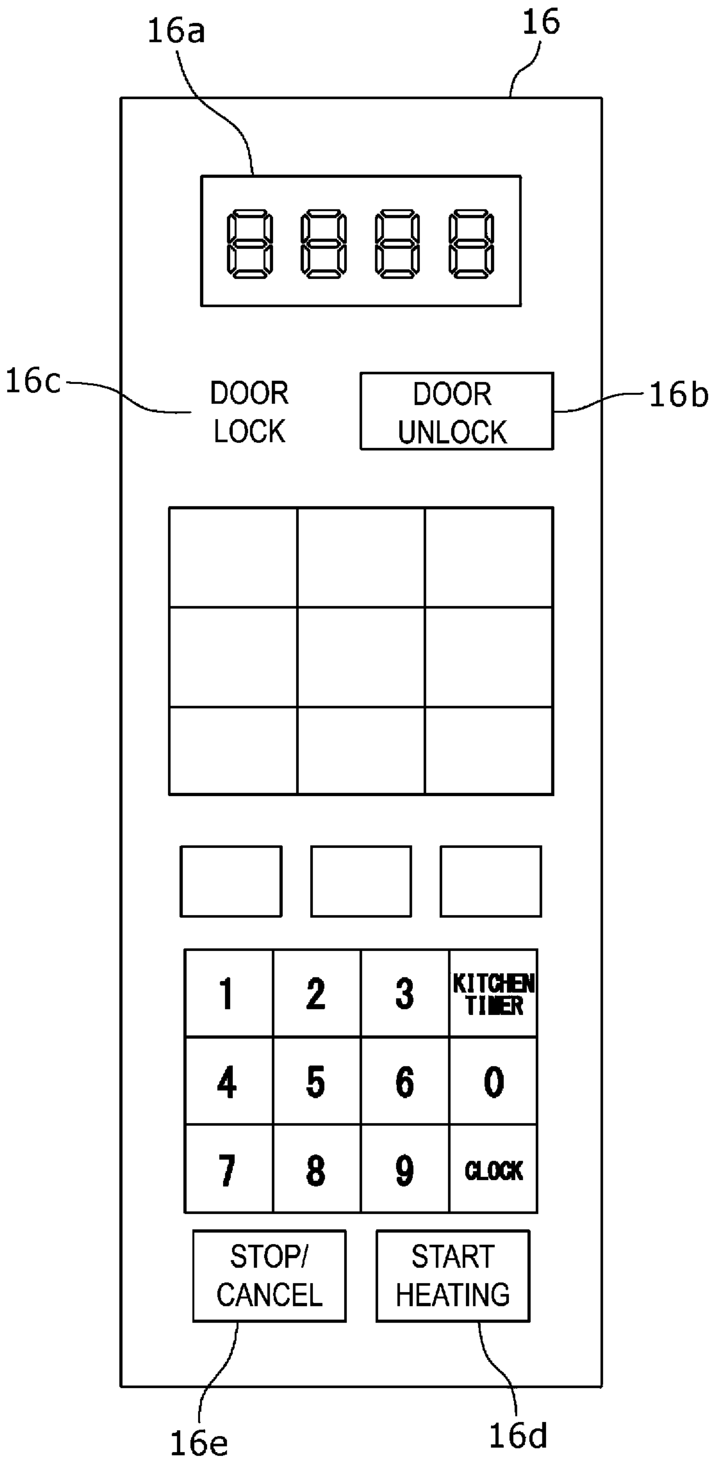
FIG. 3 is a schematic view illustrating an example of an operation panel 16 of the heating cooking apparatus 100.

First, a basic configuration of a first embodiment of the present disclosure will be described. FIG. 1 is a front view of a heating cooking apparatus 100 according to the first embodiment of the present disclosure with a door 12 closed. FIG. 2 is a front view of the heating cooking apparatus 100 with the door 12 open. FIG. 3 is a schematic view illustrating an operation panel 16 of the heating cooking apparatus 100.

As illustrated in FIGS. 1 and 2, the heating cooking apparatus 100 includes a box-like main body 10 including a heating chamber 11 that accommodates an object to be heated, the door 12 that opens and closes a front face opening 11*a* of the main body 10, a door opening button 15, and the operation panel 16.

The door 12 is pivotally supported on the left side of the front face opening 11*a*. A heat-resistant glass window 13 is disposed at a central portion of the door 12 so that the inside of the heating chamber 11 can be seen from outside, and latch heads 14 are provided at two locations on the back side of a side end portion, of the door 12, that is closer to the operation panel 16. Interlock mechanisms 17 for holding the latch heads 14 are provided at corresponding positions on the main body 10 side. With the interlock mechanisms 17, the heating cooking apparatus 100 is configured so that a heating operation in which microwaves are emitted is not performed unless the door 12 is securely closed.

On the right side of the front face opening 11*a*, the door opening button 15 having a horizontally long rectangular shape is provided at or near the lower end of the front face opening 11*a*, and the operation panel 16 having a vertically long rectangular shape is disposed in a remaining portion of the right side of the front face opening 11*a*.

The door opening button 15 is configured so that a door locked state is released and the door 12 opens when a pressing operation is performed on the door opening button 15 by a user.

As illustrated in FIG. 3, the operation panel 16 includes a display 16*a*, a door unlock key 16*b*, a door locked state indicator 16*c*, a heating start key 16*d*, and a stop/cancel key 16*e*.

The display 16*a* is disposed at or near an upper edge of the operation panel 16, and can display four numbers or characters. The display 16*a* displays a set heating time, a remaining time during heating, a heating output level, a menu number, and the like.

The door unlock key 16*b* is an operation key that needs to be pressed immediately before the pressing operation on the door opening button 15, and is disposed on the right side immediately below the display 16*a*. When the door unlock key 16*b* is pressed, the door locked state is released. Then, the door 12 is opened by a subsequent pressing operation on the door opening button 15. This heating cooking apparatus 100 is configured so that unless the door unlock key 16*b* is pressed, the door locked state is not released and thus the door opening button 15 cannot be pressed. Further, the door locked state indicator 16*c*, which allows the user to visually confirm whether the door is in the locked state, is disposed on the left side of the door unlock key 16*b*. In the door locked state indicator 16*c*, a character string "door locked" is lit up brightly when the door is in the locked state, and the character string is not lit up and disappears when the door is in a door unlocked state. Note that the door locked state indicator 16*c* corresponds to a "display unit" of the present disclosure.

The heating start key 16*d* is an operation key for starting the heating operation. The stop/cancel key 16*e* is an operation key for stopping the heating operation or canceling various settings during the heating operation. Note that the operation panel 16 also includes various other keys, but description thereof is omitted herein.

1.2 Locking Unit 30 Disposed Inside Main Body 10

Figure 4A:
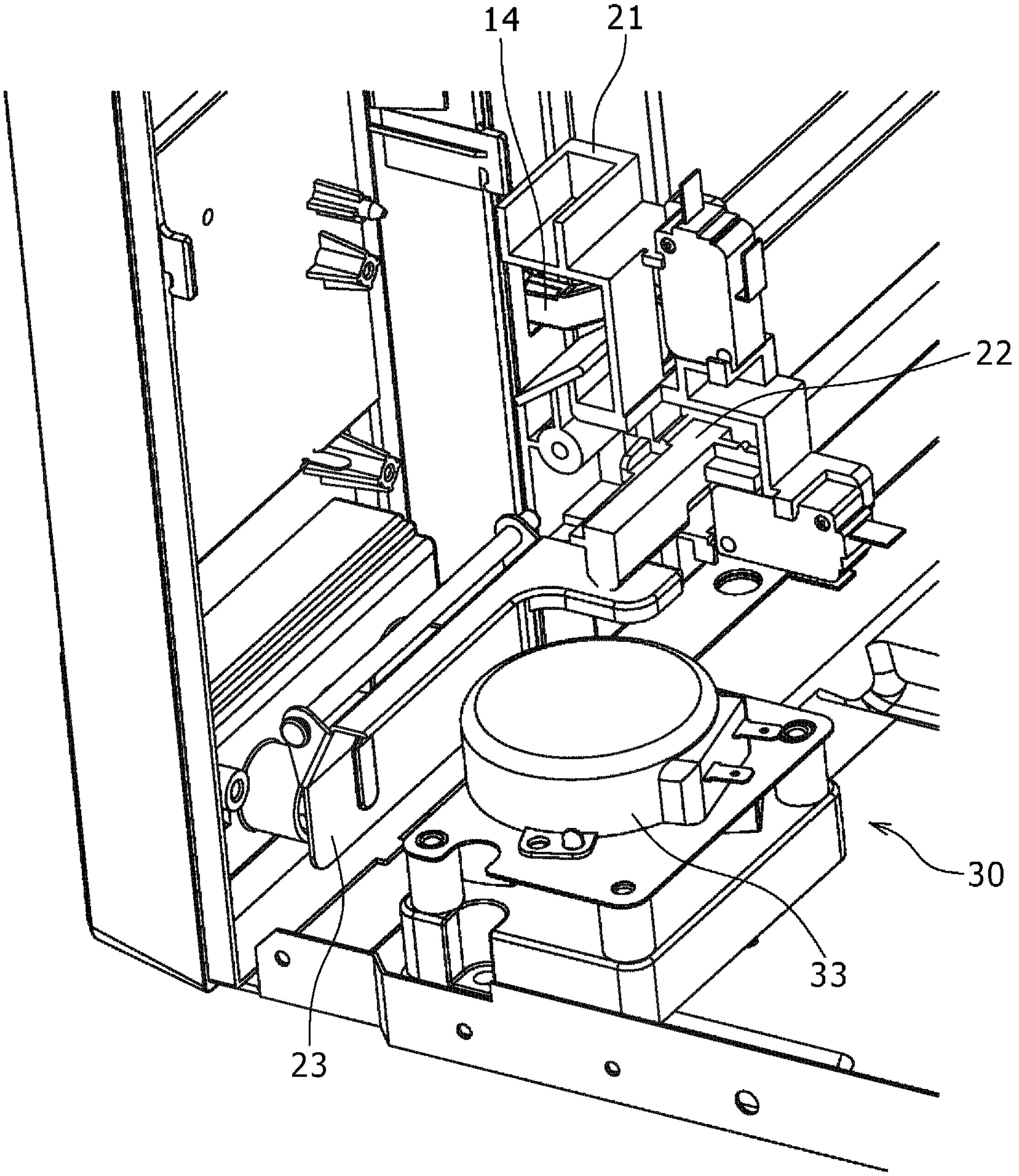
FIG. 4A is a perspective view of a locking unit 30 disposed at or near a door opening button 15 inside a main body 10, and the vicinity of the locking unit 30.
Figure 4B:
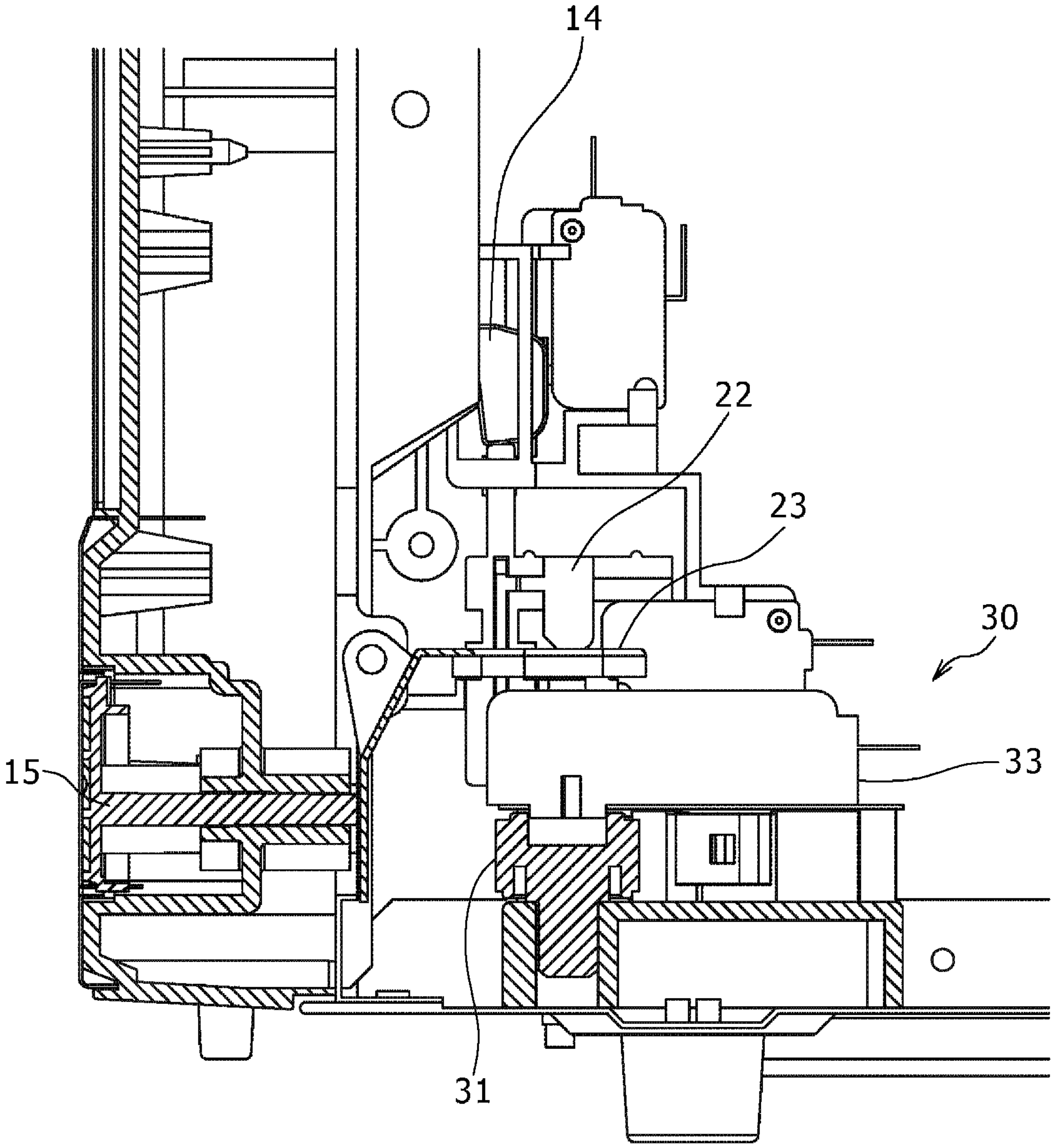
FIG. 4B is a cross-sectional view for explaining a basic operation of opening the door 12 by a pressing operation on the door opening button 15.
Figure 5A:
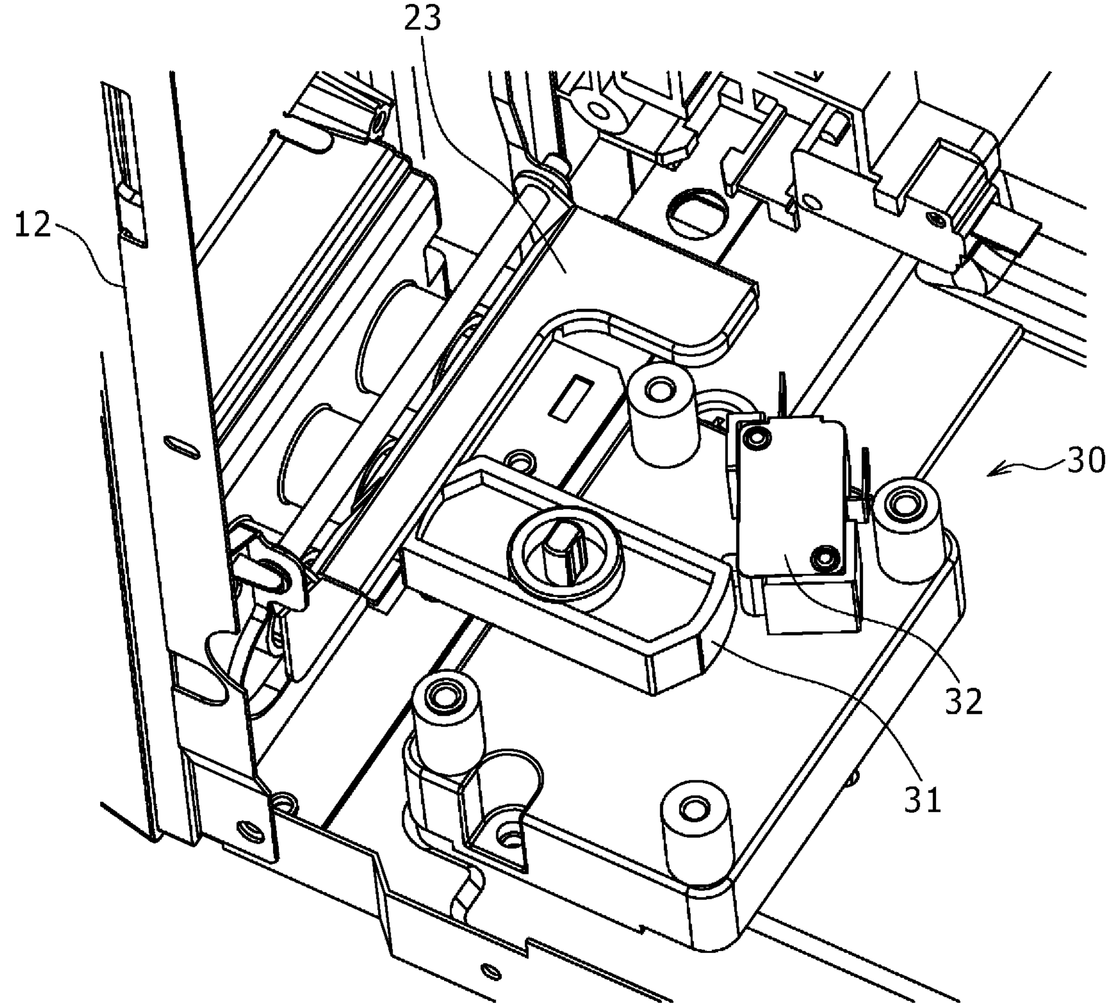
FIG. 5A is a perspective view illustrating a rotational position of a locking cam 31 inside the locking unit 30 in a door locked state.
Figure 5B:
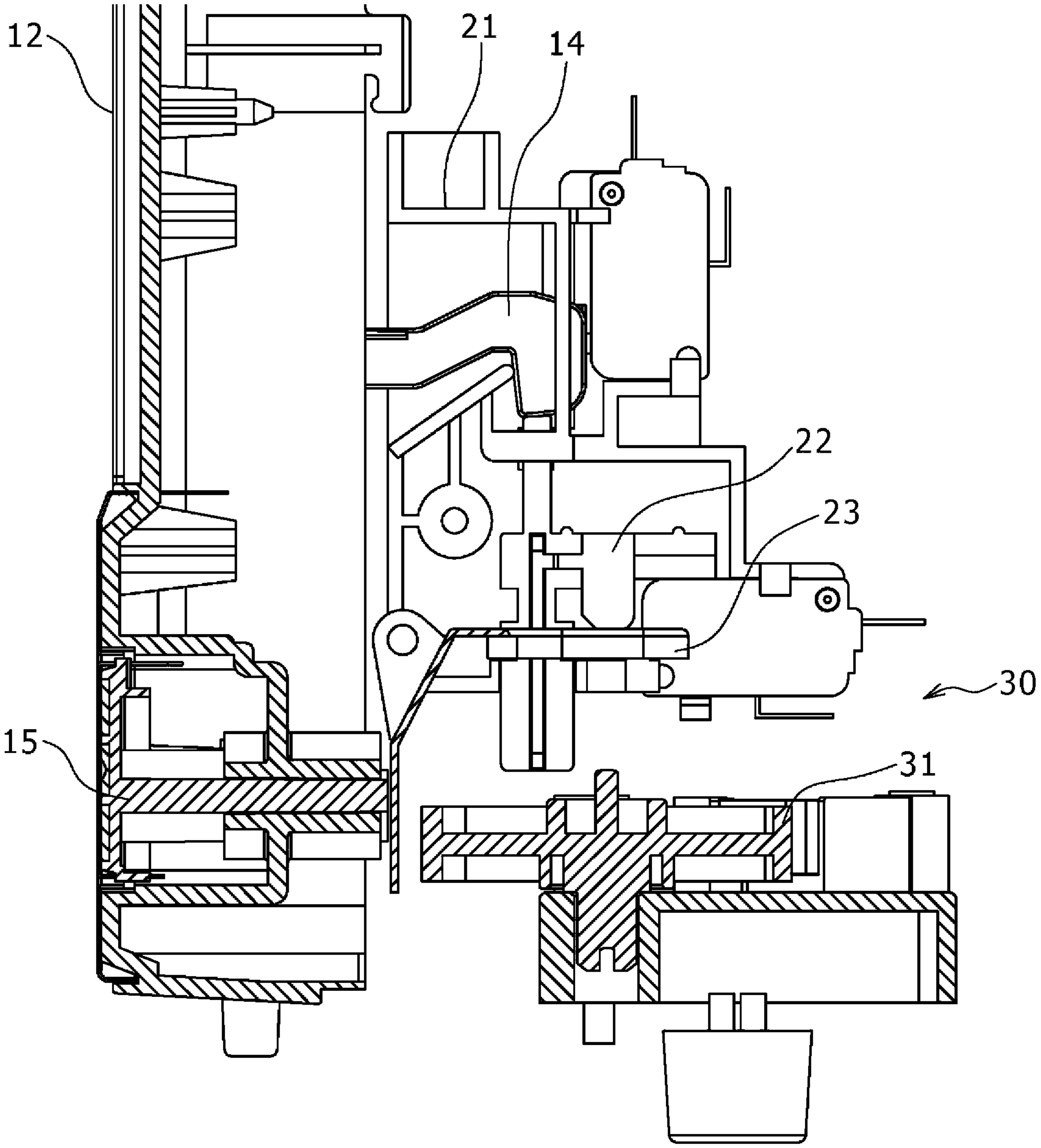
FIG. 5B is a cross-sectional view in the door locked state.
Figure 6A:
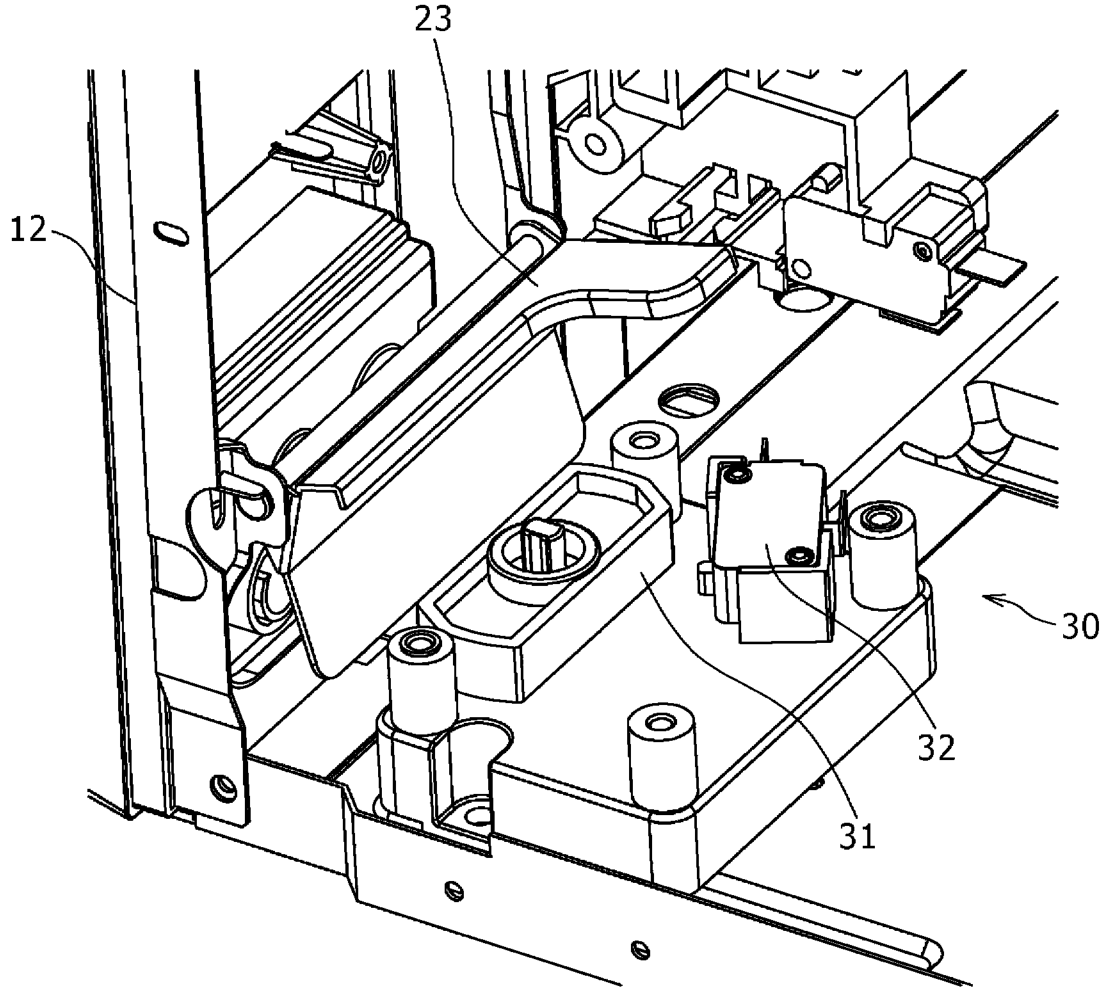
FIG. 6A is a perspective view illustrating a rotational position of the locking cam 31 inside the locking unit 30 in a door unlocked state.
Figure 6B:
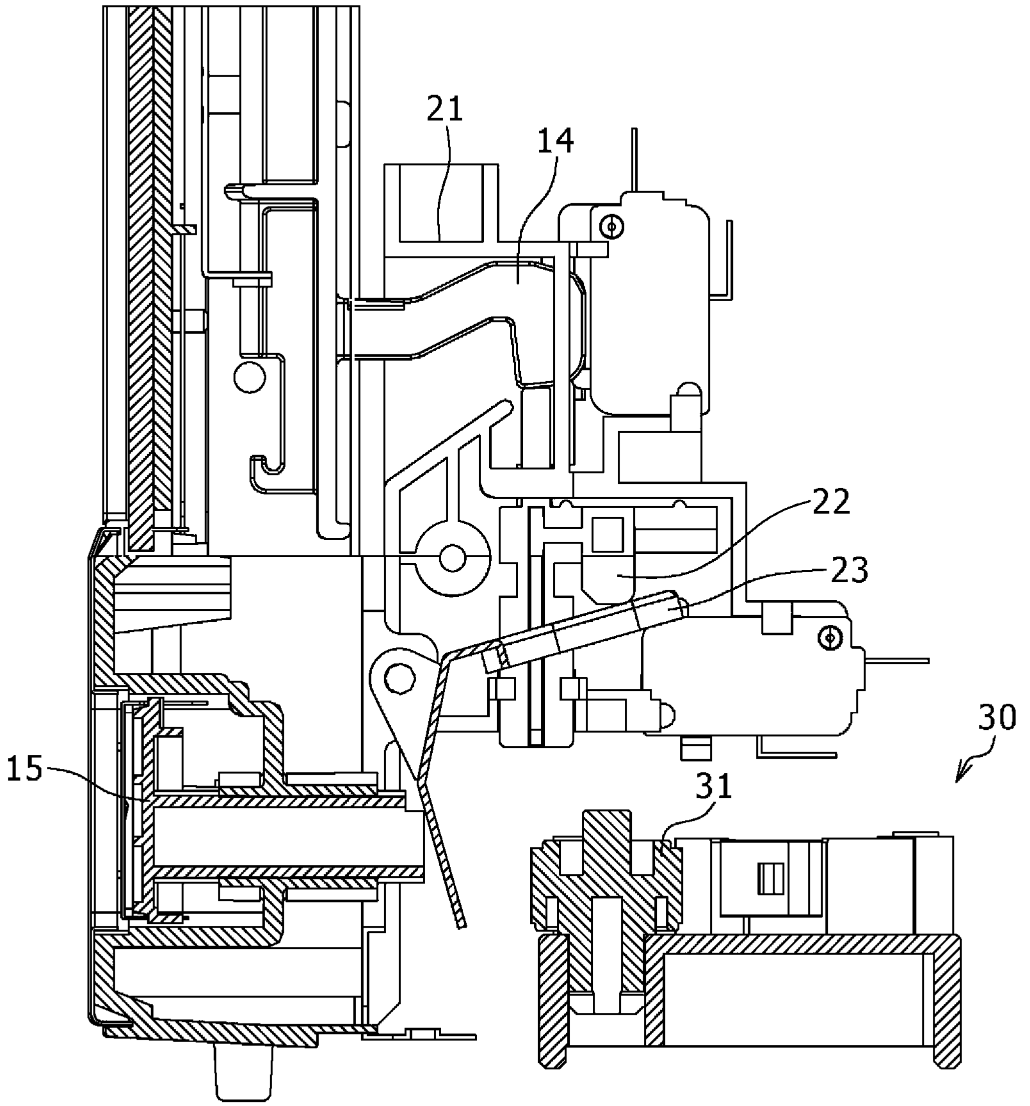
FIG. 6B is a cross-sectional view in the door unlocked state.

FIG. 4A is a perspective view of the locking unit 30 disposed at or near the door opening button 15 inside the main body 10, and the vicinity of the locking unit 30. FIG. 4B is a cross-sectional view for explaining a basic operation of opening the door 12 by performing the pressing operation on the door opening button 15. FIG. 5A is a perspective view illustrating a rotational position PL of a locking cam 31 inside the locking unit 30 in the door locked state. FIG. 5B is a cross-sectional view in the door locked state. FIG. 6A is a perspective view illustrating a rotational position PNL of the locking cam 31 inside the locking unit 30 in the door unlocked state. FIG. 6B is a cross-sectional view in the door unlocked state. Note that, in FIGS. 5A and 6A, some members constituting the locking unit 30 are not illustrated to make it easier to see the rotational positions of the locking cam 31.

As illustrated in these drawings, the locking unit 30 includes the locking cam 31 relating to limitation of the basic operation of opening the door 12, a cam phase detection switch 32 that detects the rotational position of the locking cam 31, and a synchronous motor 33 that rotates the locking cam 31.

The locking cam 31 has a shape having columnar outer peripheral surfaces at both ends, and is rotationally movable at least between the rotational position PL at which the basic operation of opening the door 12 is limited and the rotational position PNL at which the basic operation is not limited. Note that the rotational position PL and the rotational position PNL correspond to a "limiting position" and a "non-limiting position" of the present disclosure, respectively. When opening the door 12, the locking cam 31 is moved to the rotational position PNL so as not to interfere with the pressing operation on the door opening button 15. Details of this operation will be described below with reference to FIGS. 6A and 6B.

The cam phase detection switch 32 detects the phase corresponding to the rotational position of the locking cam 31, as ON or OFF. In this locking cam 31, a rotational position at which the cam phase detection switch 32 changes from ON to OFF is set as an initial position corresponding to the door locked state. Examples of the cam phase detection switch 32 include, but are not limited to, a micro switch.

The synchronous motor 33 rotates the locking cam 31 in one direction, for example, the counterclockwise (CCW) direction. The motor for rotating the locking cam 31 is not limited to the synchronous motor, and may be a stepper motor, for example. Further, the rotational direction is not limited to one direction and may be both directions. However, it is assumed that a switch or the like necessary for accurately detecting the rotational position of the locking cam 31 (at least the position corresponding to the door locked state) is provided.

In addition, the heating cooking apparatus 100 includes a first lever 22 and a second lever 23 inside the main body 10, which transmit a displacement caused by the pressing operation performed on the door opening button 15. The displacement of the door opening button 15 is transmitted from the second lever 23 to the first lever 22, and further to the latch head 14 that engages with a latch hook 21.

When the pressing operation on the door opening button 15 is performed, an inner portion of the door opening button 15 comes into contact with the second lever 23 and rotates the second lever 23. As a result, the second lever 23 comes into contact with the first lever 22 and pushes up the first lever 22. Then, the pushed up first lever 22 comes into contact with the latch head 14 provided on the back side of the door 12 and pushes up the latch head 14. As a result, the engagement between the latch head 14 and the latch hook 21 is released, and the door 12 is opened.

As illustrated in FIGS. 5A and 5B, when the locking cam 31 of the locking unit 30 is moved to the rotational position PL at which the basic operation for opening the door 12 is limited, the outer peripheral surface of the locking cam 31 is in close proximity to the inner portion of the door opening button 15.

Thus, even if an attempt is made to perform the pressing operation on the door opening button 15, the inner portion of the door opening button 15 immediately comes into contact with the locking cam 31, and the door opening button cannot be pressed in any further. As a result, since the second lever 23 does not rotate, the first lever 22 is not pushed up, and thus the latch head 14 is not pushed up either, so the engagement between the latch head 14 and the latch hook 21 is not released. In other words, a state (door locked state) is achieved in which the door 12 cannot be opened by performing the pressing operation on the door opening button 15.

On the other hand, as illustrated in FIGS. 6A and 6B, when the locking cam 31 of the locking unit 30 is moved to the rotational position PNL, the outer peripheral surface of the locking cam 31 is sufficiently separated from the inner portion of the door opening button 15.

Thus, when the pressing operation on the door opening button 15 is performed, the basic operation of opening the door 12, which is described above with reference to FIGS. 4A and 4B, is performed. In other words, a state (door unlocked state) is achieved in which the door 12 can be opened by performing the pressing operation on the door opening button 15.

Note that the locking unit 30 is an example of a main configuration for realizing the heating cooking apparatus of the present disclosure. Since it is sufficient simply to dispose and fix the locking unit 30 at or near the door opening button 15 inside the main body 10, changing the actual design of the main body 10 or the like is not necessary. Thus, the locking unit 30 can be retrofitted to many existing heating cooking apparatuses.

1.3 Electrical Configuration

Figure 7:
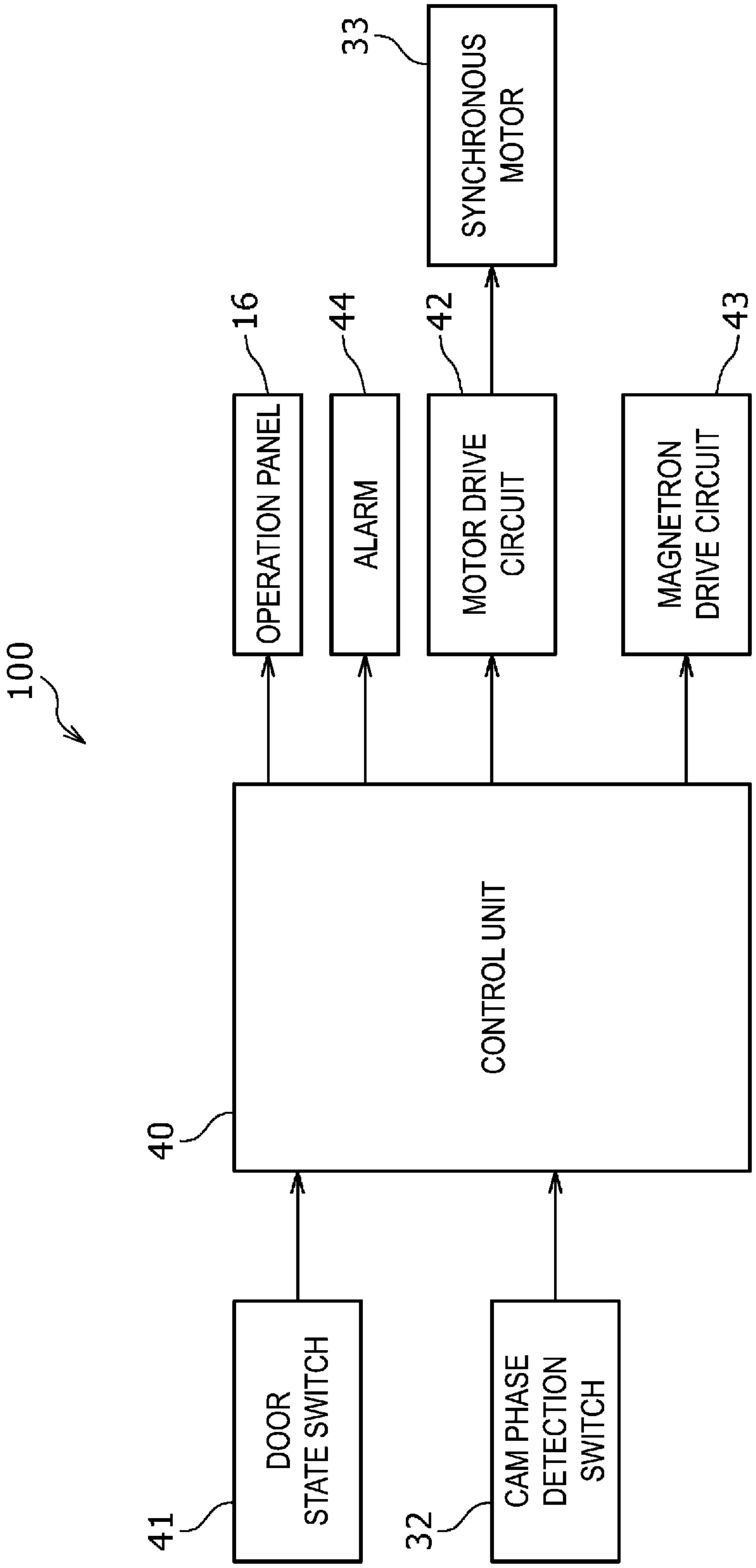
FIG. 7 is a block diagram illustrating an overall electrical configuration of the heating cooking apparatus 100.

FIG. 7 is a block diagram illustrating an overall electrical configuration of the heating cooking apparatus 100.

As illustrated in FIG. 7, the heating cooking apparatus 100 includes a control unit 40 that performs overall control.

A door state switch 41 that detects an open/closed state of the door 12 and the cam phase detection switch 32 that detects the phase corresponding to the rotational position of the locking cam 31 are connected to an input to the control unit 40.

On the other hand, the operation panel 16, an alarm 44, a motor drive circuit 42 that drives the synchronous motor 33, and a magnetron drive circuit 43 that drives a magnetron (not illustrated) for emitting microwaves are connected to an output from the control unit 40. Note that the alarm 44 corresponds to a "notification unit" of the present disclosure.

1.4 Flowchart of Main Processing

Figure 8:
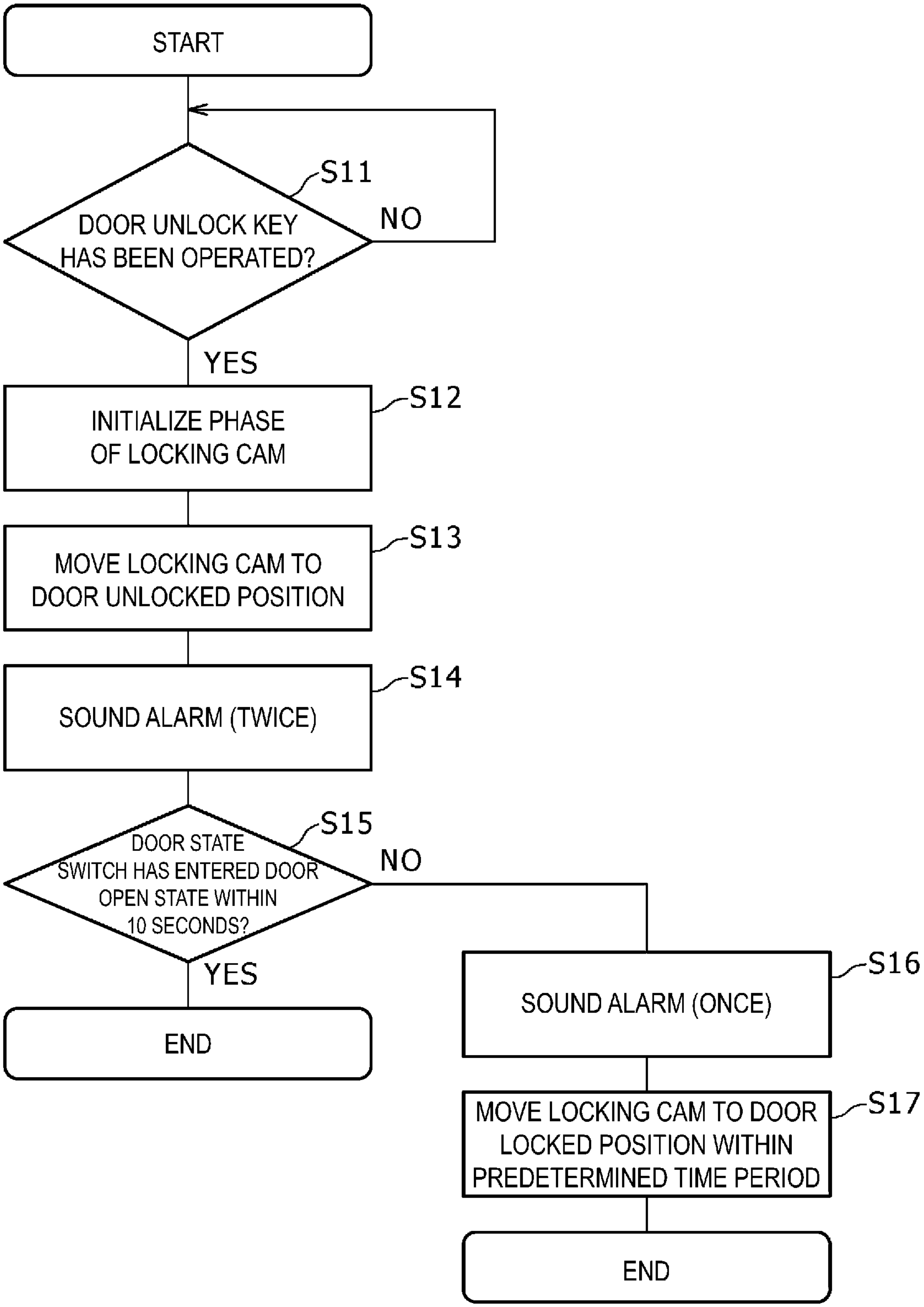
FIG. 8 is a flowchart illustrating processing performed by a control unit 40 when a door unlock key **16*b*** is operated.

FIG. 8 is a flowchart illustrating processing performed by the control unit 40 when the door unlock key 16*b* is operated.

The control unit 40 monitors whether an operation is performed on each of the keys disposed on the operation panel 16, and controls the heating cooking apparatus 100 according to the key to which an operation has been performed. The control unit 40 also monitors whether an operation has been performed on the door unlock key 16*b* disposed at the operation panel 16. Note that, although it is assumed that the door 12 is in the closed state at the start of processing described below, a condition determination such as step S22 in FIG. 9 described below may be added. Alternatively, monitoring the presence and absence of an operation on each of the keys disposed in the operation panel 16 may be performed only when the door 12 is closed.

As illustrated in FIG. 8, at step S11, the control unit 40 checks whether the door unlock key 16*b* has been operated, and if no operation has been performed, the processing returns to the original state. If an operation has been performed, the processing proceeds to the next step S12.

At step S12, the phase of the locking cam 31 is initialized. Specifically, the synchronous motor 33 is driven by the motor drive circuit 42, and when it is detected that the cam phase detection switch 32 has changed from OFF to ON and then changed to OFF once again, the synchronous motor 33 is braked and stopped. As a result, the locking cam 31 stops at the initial position corresponding to the door locked state (see FIGS. 5A and 5B).

At step S13, the synchronous motor 33 is driven by the motor drive circuit 42 for a predetermined time period (430 ms in this example) to rotate the locking cam 31 by 90 degrees. As a result, the locking cam 31 is moved to the rotational position corresponding to the door unlocked state (see FIGS. 6A and 6B). Unlike when the locking cam 31 is rotationally moved to the initial position (step S12), the rotation by 90 degrees can be controlled only by controlling the driving time of the synchronous motor 33. However, a specific driving time needs to be determined in advance based on specifications of the synchronous motor 33 or the like.

At step S14, an alarm is sounded twice to notify the user that the door has entered the door unlocked state. However, this step may be omitted.

Thereafter, at step S15, the state of the door state switch 41 is monitored, and if the door 12 is changed to the open state within 10 seconds, the series of processing is terminated. However, if the state of the door state switch 41 has not changed, it is determined that the user has attempted to open the door 12 but has not actually opened the door 12, and the processing proceeds to step S16.

Since it is not preferable for the door 12 to be left in the door unlocked state even if the door 12 is closed, the door 12 is returned to the door locked state once again. Prior to this, at step S16, the alarm is sounded once to notify the user. Here, changing the number of times the alarm is sounded can clearly distinguish this state from when the door 12 has entered door unlocked state (step S14). However, this step may be omitted.

At step S17, in the same manner as at step S12, the phase of the locking cam 31 is initialized. In other words, the locking cam 31 is moved to the initial position corresponding to the door locked state.

Figure 9:
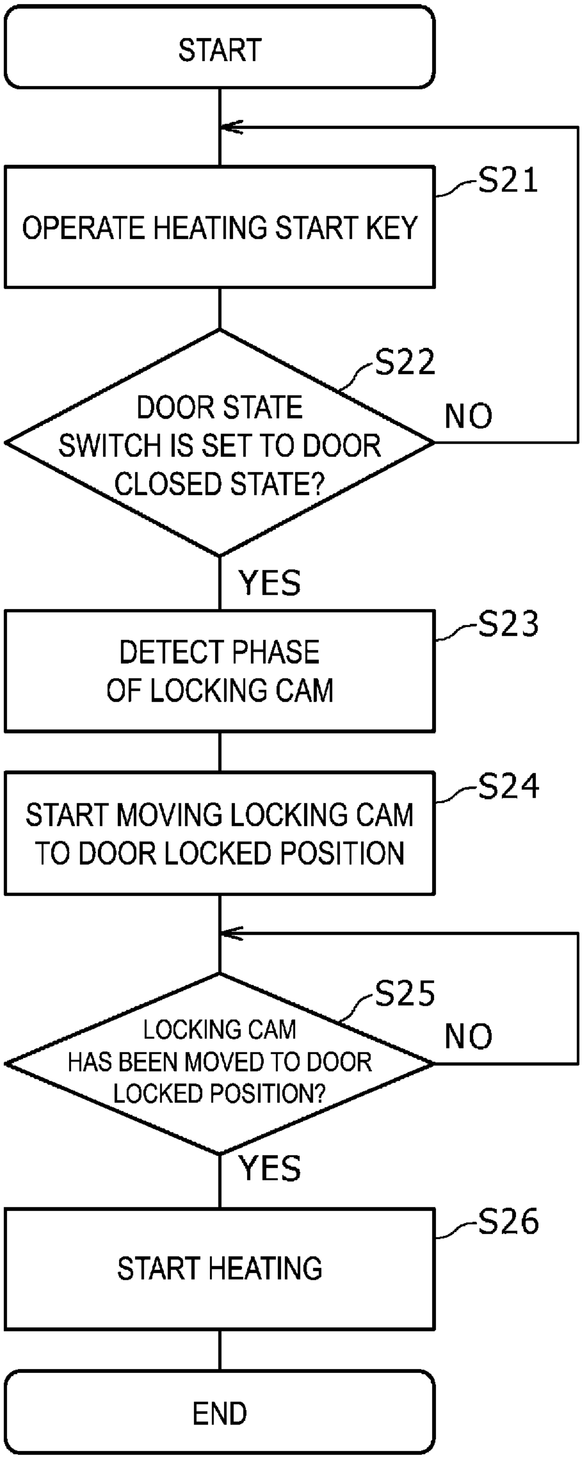
FIG. 9 is a flowchart illustrating processing performed by the control unit 40 when a heating start key **16*d*** is operated.

FIG. 9 is a flowchart illustrating processing performed by the control unit 40 when the heating start key 16*d* is operated.

As illustrated in FIG. 9, at step S21, the control unit 40 checks whether the heating start key 16*d* has been operated, and if no operation has been performed, the processing returns to the original state. If an operation has been performed, the processing proceeds to the next step S22.

At step S22, the state of the door state switch 41 is detected, and when the detection result indicates that the door 12 is in the closed state, the processing proceeds to the next step S23. Otherwise (when the detection result indicates that the door 12 is in the open state), the processing returns to the original state without performing the processing subsequent to step S23. This is because the heating operation in which microwaves are emitted is not performed unless the door 12 is securely closed, due to the interlock mechanisms 17 (see FIG. 2).

At step S23, the cam phase detection switch 32 detects the phase of the locking cam 31. At step S24, the synchronous motor 33 is driven by the motor drive circuit 42 to start the rotational movement of the locking cam 31. At step S25, when the control unit 40 detects that the cam phase detection switch 32 has changed from ON to OFF, the synchronous motor 33 is braked and stopped. As a result, the locking cam 31 stops at the initial position corresponding to the door locked state. Note that steps S23 to S25 are substantially the same as the processing at step S12.

By the processing up to this point, it is confirmed that the door 12 is in the closed state, and that the door 12 has entered the door locked state in which the door 12 cannot be opened by performing the pressing operation on the door opening button 15. Then, at step S26, the magnetron drive circuit 43 drives the magnetron to start emitting microwaves to heat an object to be heated.

Figure 10:
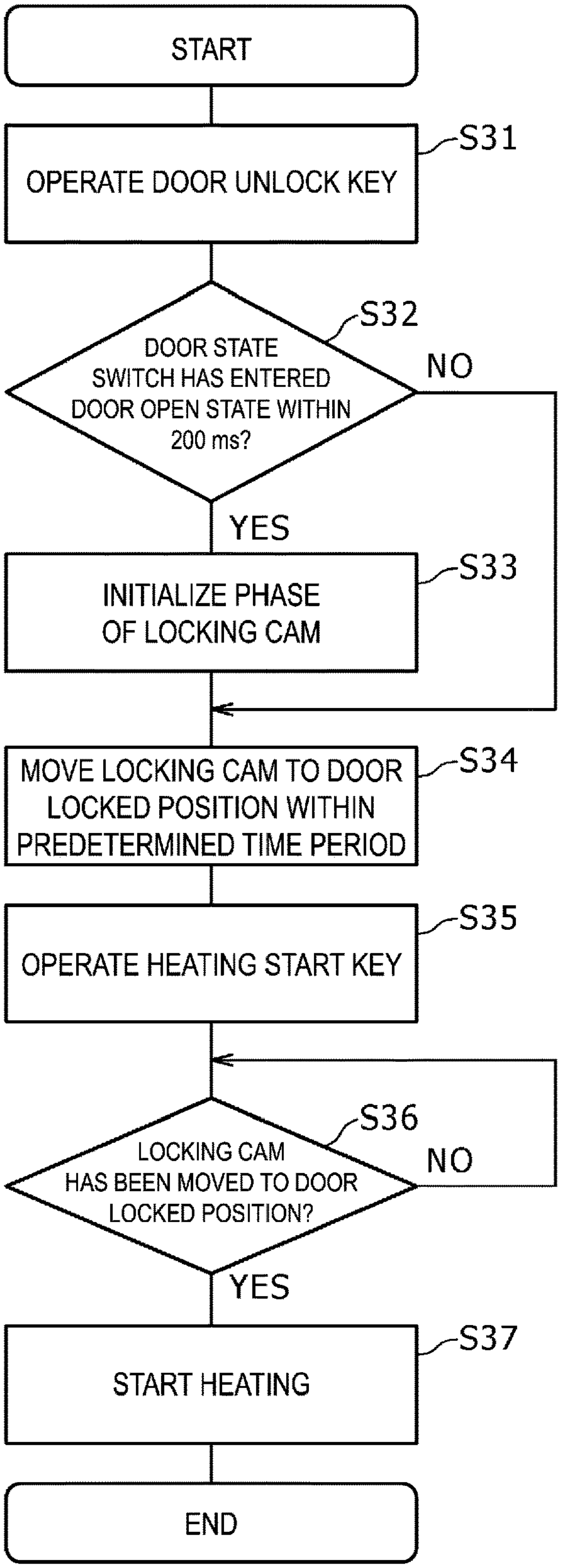
FIG. 10 is a flowchart illustrating processing performed by the control unit 40 when the door 12 is opened within an extremely short time period after the door unlock key **16*b*** has been operated.

FIG. 10 is a flowchart illustrating processing performed by the control unit 40 when the door 12 is opened within an extremely short time period after the door unlock key 16*b* has been operated. Note that, in a normal case in which the door 12 is opened after the above-described short time period has elapsed from when the door unlock key 16*b* is operated, the processing according to the flowchart illustrated in FIG. 8 is performed.

At step S31, in the same manner as at step S11 in FIG. 8, the control unit 40 checks whether the door unlock key 16*b* has been operated, and if it has been operated, the processing proceeds to the next step S32.

At step S32, the state of the door state switch 41 is checked, and the processing proceeds to the next step S33 only when the door 12 is changed to the open state within an extremely short time period (within 200 ms, for example). Otherwise, the processing proceeds to step S34.

At step S33, the phase of the locking cam 31 is initialized in the same manner as at step S12 in FIG. 8. This is because, when the door opening button 15 is pressed within an extremely short time period after the door unlock key 16*b* has been operated, the locking cam 31 may be forcibly rotated by the door opening button 15. If the locking cam 31 is forcibly rotated by an external force, the phase (rotational position) of the locking cam 31 cannot be correctly controlled. Therefore, the phase of the locking cam 31 needs to be initialized.

At step S34, in the same manner as at step S17 in FIG. 8, the locking cam 31 is stopped at the initial position corresponding to the door locked state within a predetermined time period.

At step S35, in the same manner as at step S21 in FIG. 9, the control unit 40 checks whether the heating start key 16*d* has been operated, and only when it has been operated, the processing proceeds to the next step 36.

At step S36, in the same manner as at step S25 in FIG. 9, the control unit 40 checks whether the locking cam 31 has been moved to the initial position corresponding to the door locked state, and this check is repeated until the movement is completed. If the control unit 40 confirms that the movement has been completed, the processing proceeds to the next step S37.

At step S37, in the same manner as at step S26 in FIG. 9, the magnetron is driven by the magnetron drive circuit 43 to start emitting microwaves to heat the object to be heated.

Note that, to prevent this slightly unique situation from occurring as much as possible, it is preferable that the door unlock key 16*b* be disposed as far away from the door opening button 15 as possible. This is to ensure that a certain amount of time is required between operating the door unlock key 16*b* to performing the pressing operation on the door opening button 15. For example, it is preferable that the door unlock key 16*b* be disposed at an uppermost portion of the operation panel 16, or the door unlock key 16*b* be separated from the door opening button 15 by at least one half or more of the length of the operation panel 16 in the longitudinal direction (height direction) of the operation panel 16.

First Modified Example of First Embodiment

A configuration in which the locking unit 30 of the above-described first embodiment is replaced with a locking unit 30A will be described below as a first modified example. In this locking unit 30A, automatic reverse rotation of a synchronous motor and phase detection of a locking cam by using a micro switch similar to that of the first embodiment are employed.

Figure 11:
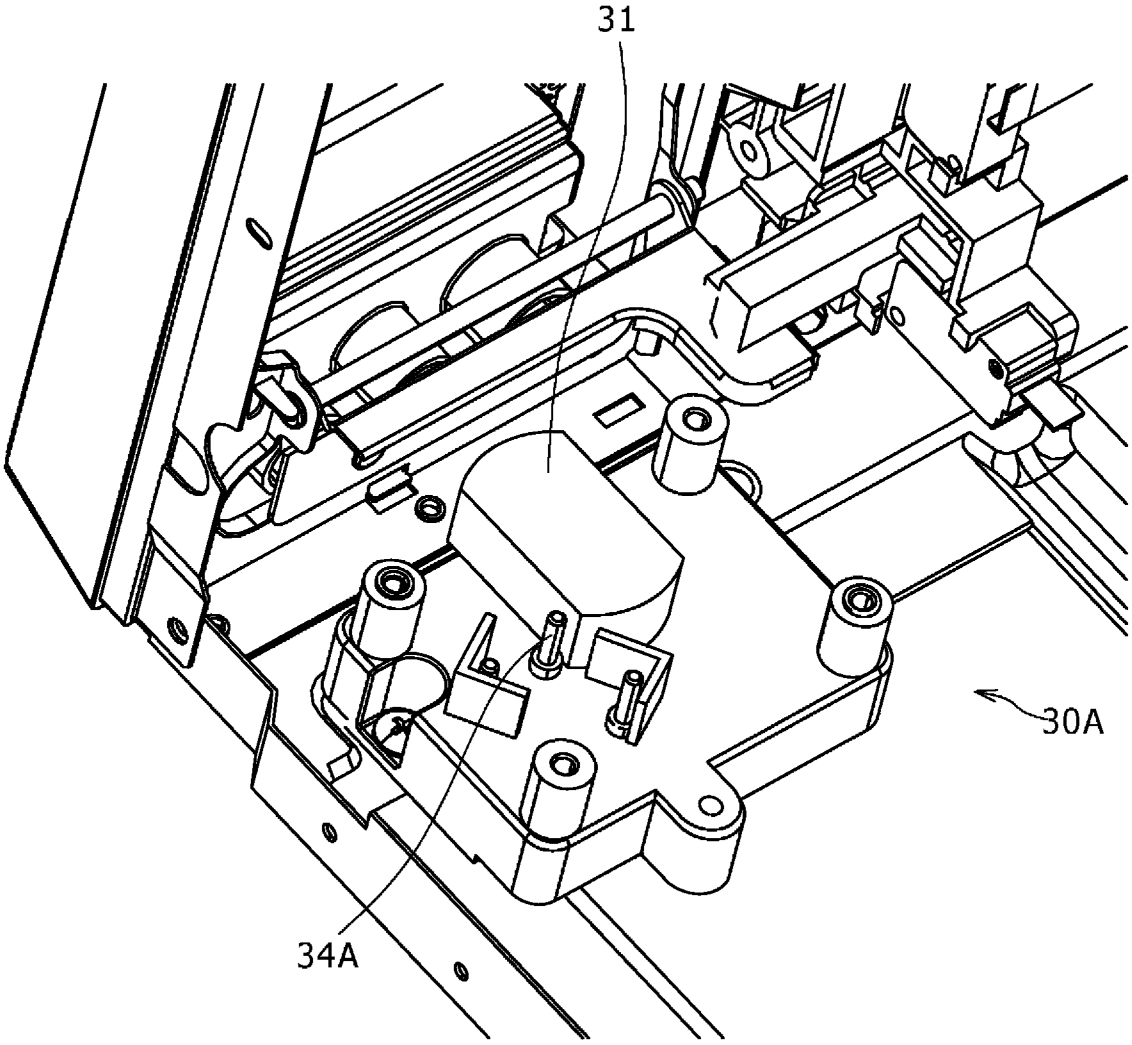
FIG. 11 is a perspective view illustrating a rotational position of the locking cam 31 in the door locked state of a locking unit 30A according to a first modified example of the first embodiment of the present disclosure.
Figure 12A:
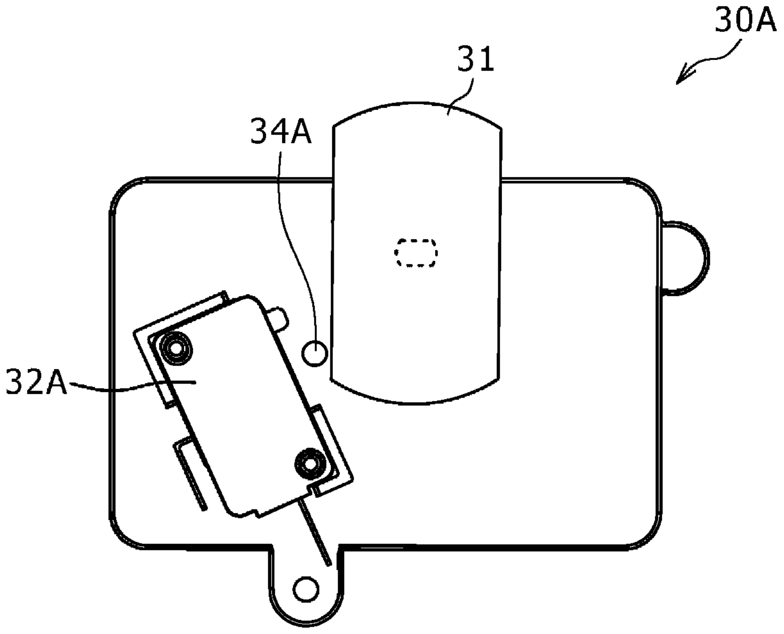
FIG. 12A is a plan view illustrating a rotational position of the locking cam 31 in the door locked state of the locking unit 30A.
Figure 12B:
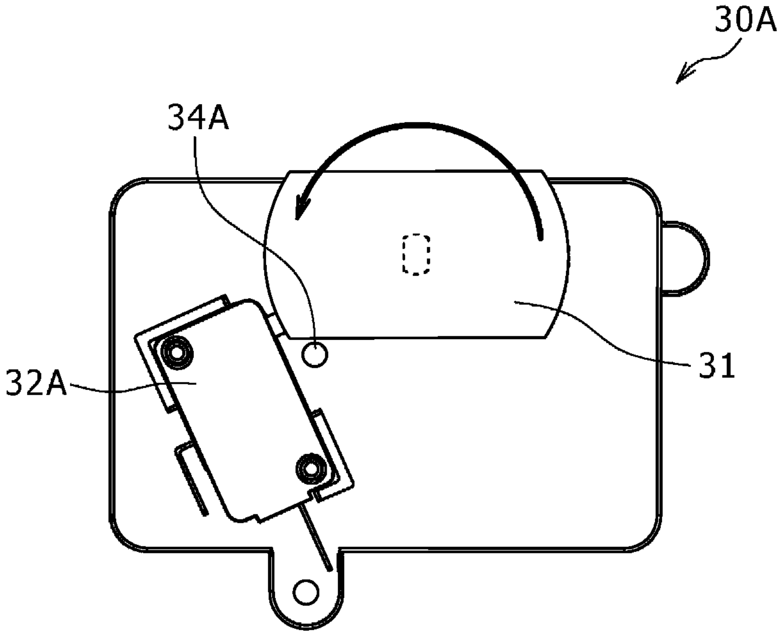
FIG. 12B is a plan view illustrating a rotational position of the locking cam 31 in the door unlocked state of the locking unit 30A.

FIG. 11 is a perspective view illustrating a rotational position of the locking cam 31 in the door locked state of the locking unit 30A according to the first modified example of the first embodiment of the present disclosure. FIG. 12A is a plan view illustrating the rotational position of the locking cam 31 in the door locked state of the locking unit 30A. FIG. 12B is a plan view illustrating a rotational position of the locking cam 31 in the door unlocked state of the locking unit 30A. Note that in these drawings, to make it easier to see the rotational positions of the locking cam 31A, illustration of the synchronous motor and the like constituting the locking unit 30A is omitted.

The locking unit 30A includes the locking cam 31, a cam phase detection switch 32A, the synchronous motor 33, and a stopper pin 34A.

The synchronous motor 33 is driven by the motor drive circuit 42. When the synchronous motor 33 is stopped at a timing at which an actuator of the cam phase detection switch 32A is pressed by the locking cam 31 to be in an ON state, the locking cam 31 enters an initial state. When the synchronous motor 33 is driven from this state, the locking cam 31 collides with the stopper pin 34A, and the rotation direction of the synchronous motor 33 is reversed from CCW to clockwise (CW). When the locking cam 31 rotates in the CW direction, the cam phase detection switch 32A enters an OFF state, and the synchronous motor 33 is driven for a predetermined time period from that point in time. As a result, the locking cam 31 can be stopped at a position of the locked state (initial position) (the state illustrated in FIG. 12A).

To release the door locked state, when the synchronous motor 33 is driven, the locking cam 31 collides with the stopper pin 34A and then rotates in the counterclockwise direction. As illustrated in FIG. 12B, when the control unit 40 detects that the cam detection switch 32A has been changed from OFF to ON, the driving of the synchronous motor 33 is stopped. As a result, the locking cam 31 stops at the rotational position corresponding to the door unlocked state.

Second Modified Example of First Embodiment

A configuration in which the locking unit 30 of the above-described first embodiment is replaced with a locking unit 30B will be described below as a second modified example. In this locking unit 30B, the locking cam 31B can be rotated in both directions by a stepper motor.

Figure 13A:
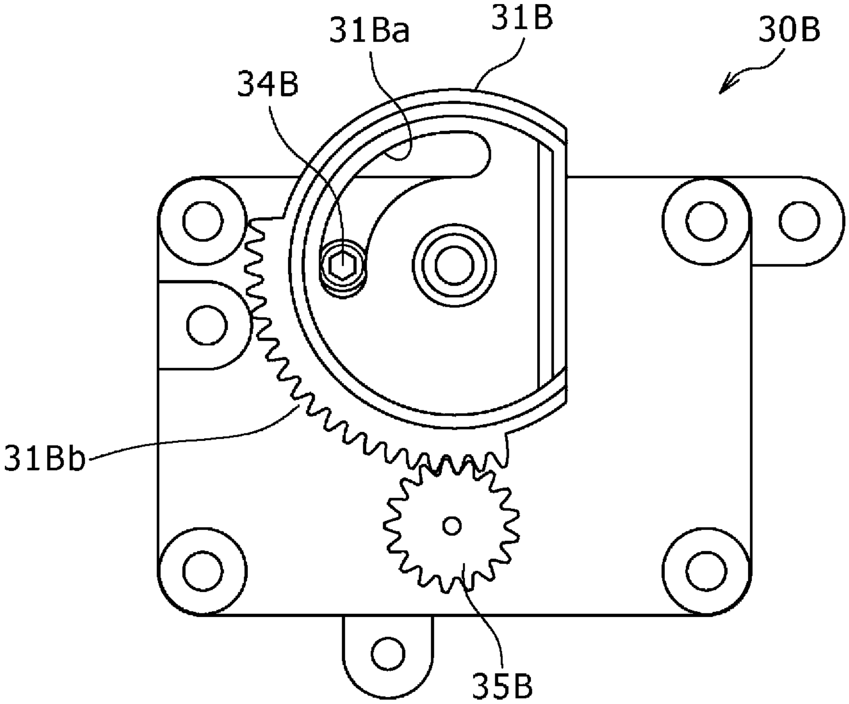
FIG. 13A is a plan view illustrating a rotational position of a locking cam 31B in the door locked state of a locking unit 30B according to a second modified example of the first embodiment of the present disclosure.
Figure 13B:
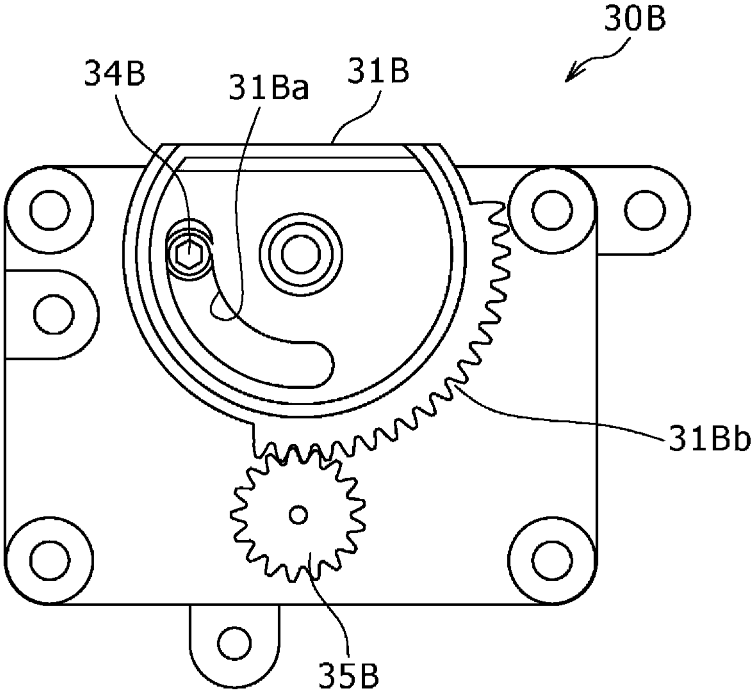
FIG. 13B is a plan view illustrating a rotational position of the locking cam 31B in the door unlocked state of the locking unit 30B.

FIG. 13A is a plan view illustrating a rotational position of the locking cam 31B in the door locked state of the locking unit 30B according to the second modified example of the first embodiment of the present disclosure. FIG. 13B is a plan view illustrating a rotational position of the locking cam 31B in the door unlocked state of the locking unit 30B. Note that in these drawings, to make it easier to see the rotational positions of the locking cam 31B, illustration of the stepper motor and the like constituting the locking unit 30B is omitted.

The locking unit 30B includes the locking cam 31B, a stepper motor (not illustrated), a stopper pin 34B, and a pinion gear 35B.

This locking cam 31B is provided with a cam inner groove 31Ba and a cam outer peripheral gear 31Bb. The stopper pin 34B is disposed inside the cam inner groove 31Ba to limit a rotation range of the locking cam 31B to about 90 degrees. The pinion gear 35B transmits rotation from the stepper motor to the cam outer peripheral gear 31Bb to rotate the locking cam 31B.

In the locking unit 30B, the stepper motor is driven by the motor drive circuit 42 to rotate the locking cam 31B in the clockwise (CW) direction. Due to this rotation, one end of the cam inner groove 31Ba of the locking cam 31B comes into contact with the stopper pin 34B, as illustrated in FIG. 13A. Since the locking cam 31B cannot be rotated any further and the stepper motor steps out, the driving of the stepper motor is stopped at this rotational position. As a result, the locking cam 31B stops at an initial position corresponding to the door locked state.

To release the door locked state, the stepper motor is driven in the reverse direction by a predetermined number of pulses to rotate the locking cam 31B in the counterclockwise direction. By this rotation, the cam inner groove 31Ba of the locking cam 31B can be stopped at the rotational position corresponding to the door unlocked state without colliding with the stopper pin 34B, as illustrated in FIG. 13B.

Figure 14:
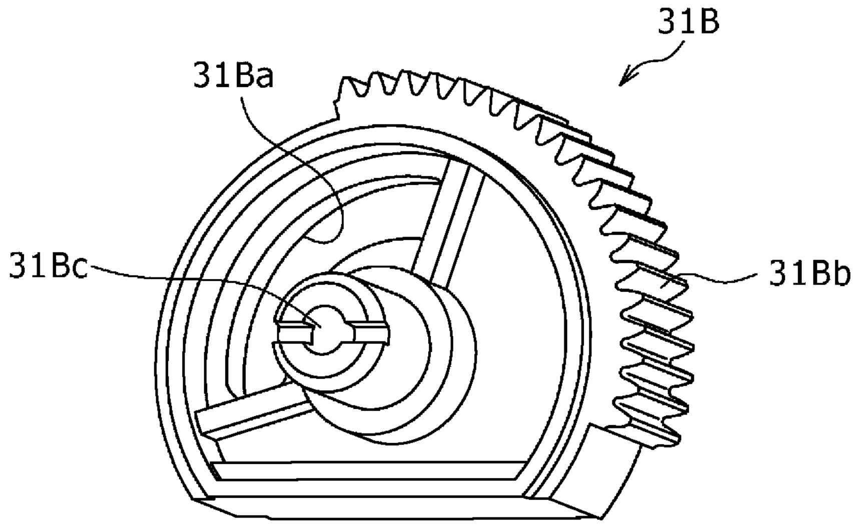
FIG. 14 is a perspective view of the locking cam 31B as viewed from below.

FIG. 14 is a perspective view of the locking cam 31B as viewed from below.

As illustrated in FIG. 14, a groove 36Bc for a flat head screwdriver is provided at a shaft portion of the locking cam 31B, the shaft portion being provided on the lower side of the locking cam 31B.

Then, the locking unit 31B provided with the above-described locking cam 30B is disposed at or near the door opening button 15 inside the main body, and a hole into which a flat head screwdriver can be inserted is formed in the bottom surface of the main body. It is preferable that the hole be normally closed with a cap or the like.

According to such a configuration, even if the door cannot be unlocked by operating the door unlock key 16*b* due to power failure or malfunction, a flat head screwdriver can be inserted to rotate the locking cam 31B. As a result, the door 12 can be manually put in the door unlocked state and performing the pressing operation on the door opening button 15.

Embodiments of the present disclosure have been described above with reference to the drawings. However, the present disclosure is not limited to the embodiments described above, and the present disclosure can be implemented in various modes without departing from the gist thereof. Further, the present disclosure can be made in various forms by appropriately combining a plurality of components disclosed in the embodiments described above. For example, some components may be removed from all of the components described in the embodiments. For easier understanding, the drawings schematically illustrate respective main components, but the number of illustrated components or the like may differ from the actual number of components for the sake of convenience in creating the drawings. In addition, each of the components described in the above embodiments is exemplary and is not particularly limited, and various modifications can be made within a range that does not substantially depart from the effects of the present disclosure.

INDUSTRIAL APPLICABILITY

The present disclosure is applicable to a field such as that of a heating cooking apparatus having a configuration in which a door of a front face opening of a heating chamber is opened by a mechanical operation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A heating cooking apparatus comprising:

a main body including a heating chamber accommodating an object to be heated;

a door configured to open and close a front face opening of the heating chamber;

a locking member provided at the door;

a holding member provided at the main body and configured to hold the locking member to cause the door to be in a locked state;

a first operation member configured to be displaced between a first position and a second position and to be operated to open the door;

a second operation member configured to be operated to release the locked state of the door;

a displacement transmission mechanism configured to transmit a displacement of the first operation member from the first position, and to release the locked state of the door by the holding member by causing the first operation member to be displaced to the second position;

a displacement transmission limiting member configured to be movable between a limiting position at which at least one of the displacement of the first operation member and the transmission by the displacement transmission mechanism is limited, and a non-limiting position at which neither the displacement of the first operation member nor the transmission by the displacement transmission mechanism is limited; and a driving unit configured to cause the displacement transmission limiting member to move to the non-limiting position in response to an operation of the second operation member.

2. The heating cooking apparatus according to claim 1, further comprising a control unit configured to electrically control the movement of the displacement transmission limiting member to the non-limiting position by the driving unit.

3. The heating cooking apparatus according to claim 1, further comprising a display unit configured to visually display whether the door is in the locked state.

4. The heating cooking apparatus according to claim 1, further comprising a notification unit configured to audibly notify that the door has entered the locked state or that the locked state is released.

5. The heating cooking apparatus according to claim 2, wherein the control unit causes the driving unit to move the displacement transmission limiting member to the limiting position before a heating operation is started.

6. The heating cooking apparatus according to claim 1, wherein the displacement transmission limiting member is configured to be manually movable to the non-limiting position from outside the main body.

7. The heating cooking apparatus according to claim 1, further comprising an operation unit provided at a front face of the main body and at which the first operation member and the second operation member are disposed, wherein the first operation member and the second operation member are separated from each other by one half or more of a length of the operation unit in a longitudinal direction of the operation unit.

* * * * *